(12) United States Patent
Nilsson et al.

(10) Patent No.: US 8,194,383 B2
(45) Date of Patent: Jun. 5, 2012

(54) ARRANGEMENT FOR PREVENTING VERMIN FROM ADVANCING IN PIPES

(75) Inventors: Niclas Nilsson, Halmstad (SE); Robert Lidén, Halmstad (SE); Per Johansson, Linköping (SE)

(73) Assignee: Ratcon AB, Halmstad (SE)

( * ) Notice: Subject to any disclaimer, the term of this patent is extended or adjusted under 35 U.S.C. 154(b) by 255 days.

(21) Appl. No.: 12/451,177

(22) PCT Filed: May 9, 2008

(86) PCT No.: PCT/SE2008/050536
§ 371 (c)(1),
(2), (4) Date: Apr. 13, 2010

(87) PCT Pub. No.: WO2008/140409
PCT Pub. Date: Nov. 20, 2008

(65) Prior Publication Data
US 2010/0192483 A1    Aug. 5, 2010

(30) Foreign Application Priority Data

May 15, 2007   (SE) ..................................... 0701185

(51) Int. Cl.
*H02H 1/00* (2006.01)
(52) U.S. Cl. ........................ 361/232; 361/212
(58) Field of Classification Search .............. 361/212, 361/220, 232; 42/1.08; 102/502
See application file for complete search history.

(56) References Cited

U.S. PATENT DOCUMENTS

| 2,193,915 | A |   | 3/1940 | Baker |
|-----------|---|---|--------|-------|
| 4,539,937 | A | * | 9/1985 | Workman ............... 119/821 |
| 4,642,935 | A |   | 2/1987 | Fierer |
| 5,090,152 | A |   | 2/1992 | Ling |
| 2007/0039233 | A1 |   | 2/2007 | Lawson, Jr. |

FOREIGN PATENT DOCUMENTS

| DE | 295 15 763 | 1/1996 |
| DE | 203 07 233 | 8/2003 |
| RU | 2 063 135 | 7/1996 |
| WO | WO 03/069082 | 8/2003 |
| WO | WO 2006/053562 | 5/2006 |

* cited by examiner

*Primary Examiner* — Danny Nguyen
(74) *Attorney, Agent, or Firm* — Harness, Dickey & Pierce, P.L.C.

(57) ABSTRACT

An arrangement for preventing vermin from advancing in a pipe (20), designed for fitting in a delimited part of the pipe, comprising a contact pole (13, 22) of electrically conductive material and an opposite pole (11, 21). The contact pole, which is partially movable in the longitudinal direction of the pipe, is arranged on the inner side of the pipe, and the opposite pole is arranged separate from said contact pole in order to earth the inner side of said pipe and is arranged in or on the inner side of said pipe. The arrangement, in an active state and when the contact pole is energized, which causes a difference in electrical potential between the opposite pole and the contact pole, administers an electric shock to a vermin which tries to pass the contact pole. The invention also relates to a pipe section comprising the arrangement.

12 Claims, 4 Drawing Sheets

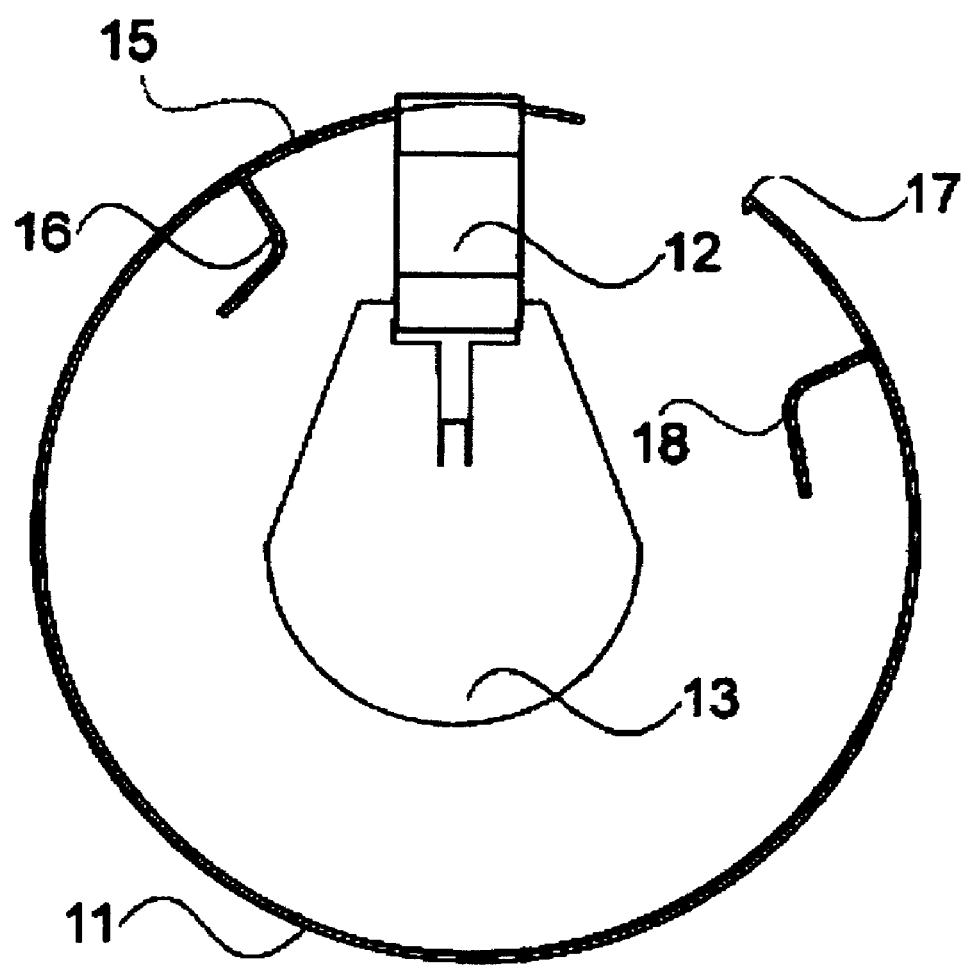
Figur 1.

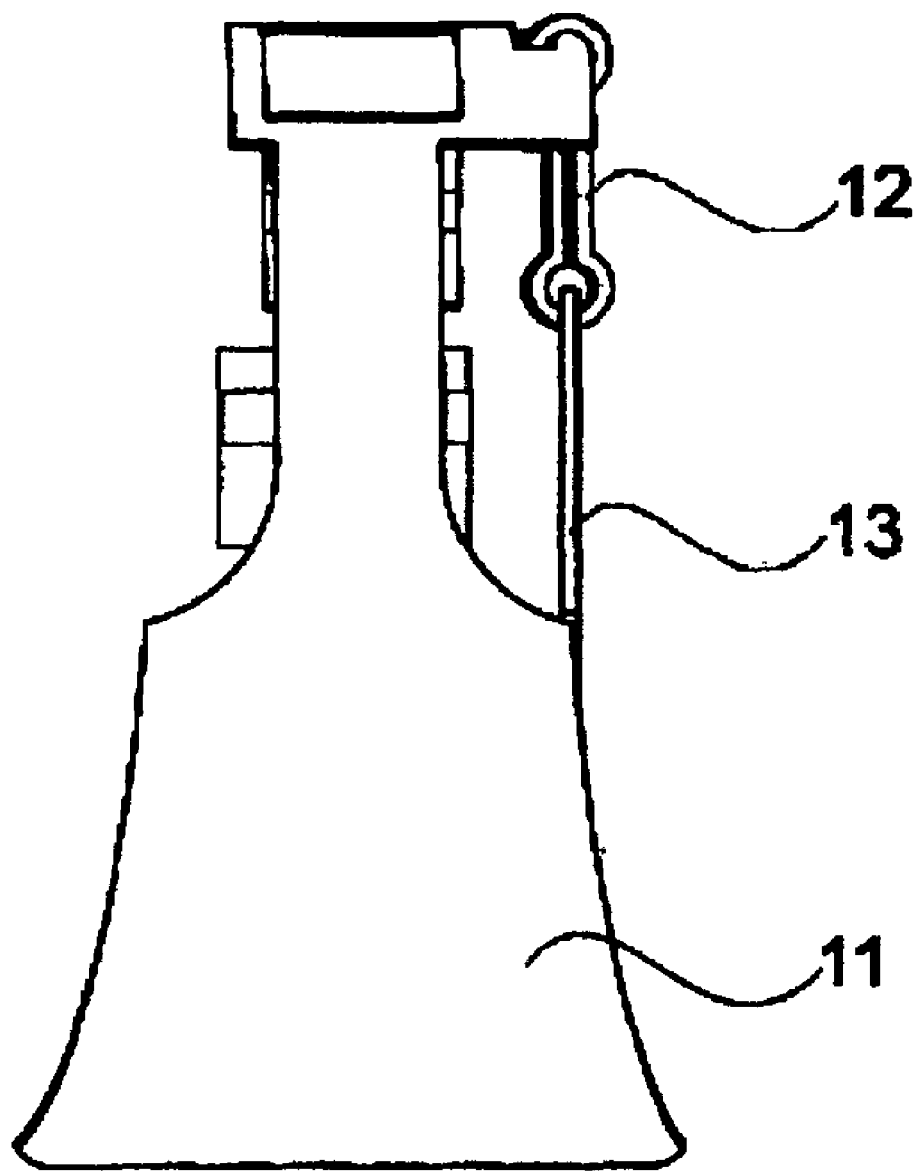
Figur 2.

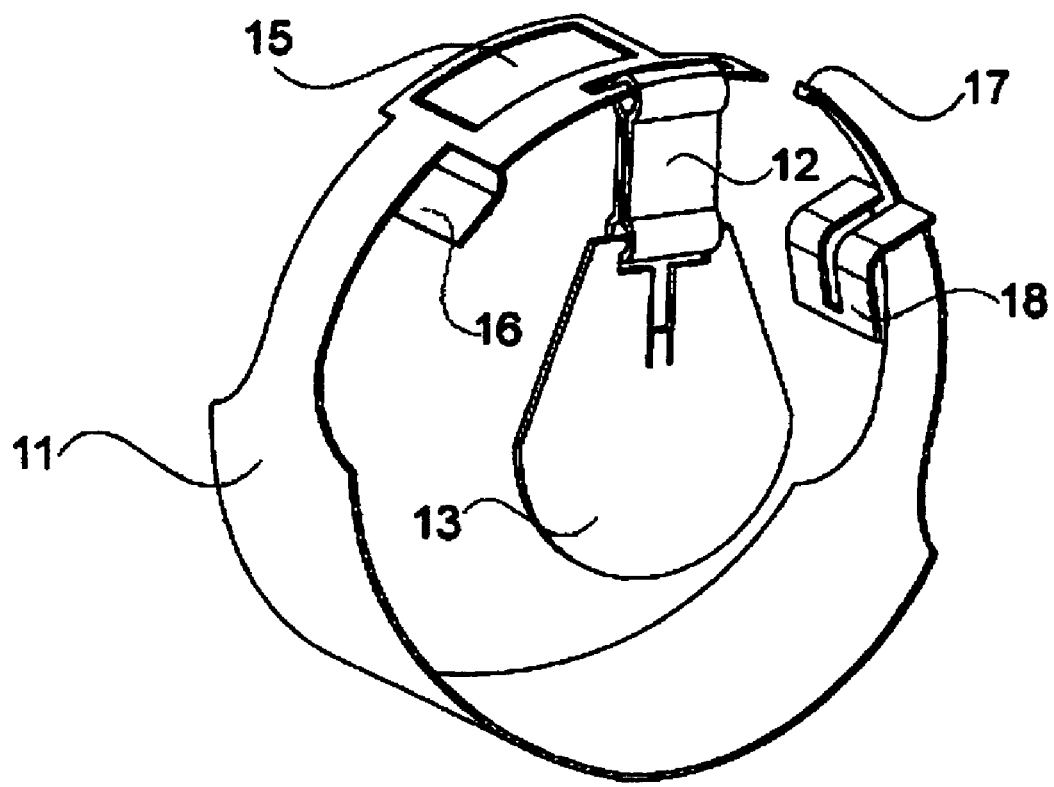
Figur 3.

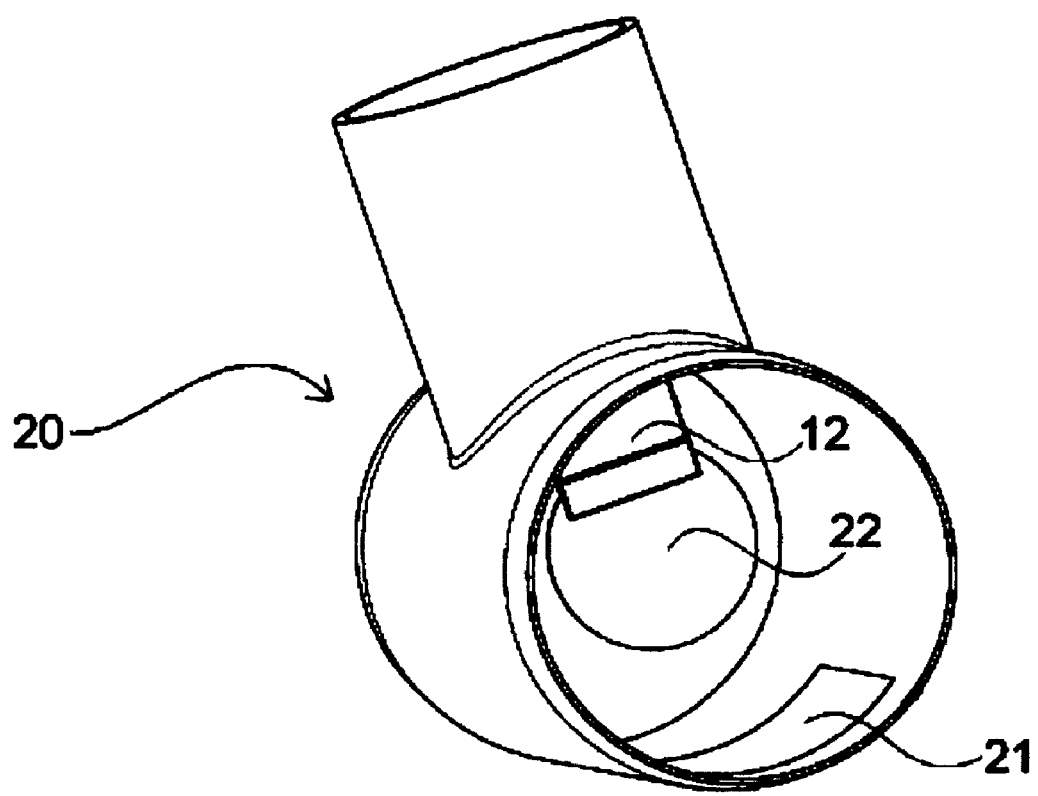
Figur 4.

ARRANGEMENT FOR PREVENTING VERMIN FROM ADVANCING IN PIPES

TECHNICAL FIELD

The present invention relates to an arrangement for preventing vermin from advancing in a pipe, designed for fitting in a delimited part of said pipe and comprising a contact pole of electrically conductive material and an opposite pole.

The invention also relates to a pipe section comprising the arrangement.

BACKGROUND OF THE INVENTION

Rats and other rodents often find their way into residential houses and other properties via sewage pipes. This is undesirable, since rodents can cause many problems from a sanitary, health-related and safety-related aspect. If rodents are able to move freely in the sewage system, they can make their way up through floor drains and also toilets. Since most sewage pipes in modern buildings are made of plastic material, there is also an obvious risk of rodents gnawing through the sewage pipes so that these begin to leak, or, if they run through earth, even fill with earth and other filling material, which leads to blockages in the sewage system. Furthermore, rodents act as spreaders of disease in properties and can sometimes even cause fires by gnawing through electric cables. For these reasons, various attempts have been made to prevent rodents from getting into houses and other properties via sewage pipes.

A mechanical solution to the problem in question is presented in WO 03/069082. The arrangement described in the document is based on the use of two tiltable, oblique shutters in a horizontal part of the sewage system. When a rodent moves against the stream up through the sewage pipe and reaches the first shutter and actuates this, the second shutter is allowed to tilt to a limited extent such that the sewage water flow is some-what restricted and acquires higher flow velocity, whereupon the rodent is incapable of withstanding the stream of water.

The arrangement is dependent, however, upon a good and lasting functioning of the mechanical parts and also upon a high flow in the sewage system. Furthermore, the arrangement can only be used in horizontal or approximately horizontal parts of the sewage system.

The arrangement described in WO 2006/053562, which is based on two mechanically interacting shutters, is also subject to the same draw-backs as the abovementioned arrangement.

A further mechanical solution is shown in U.S. Pat. No. 5,090,152 and corresponding Swedish published patent application 8801346-1. The arrangement described in the document is intended to be placed in a vertical part of the sewage system and is formed by a ring of rods, which converge in the direction of flow in such a way that the rods prevent the rodents from passing upwards past the rod ring, but which rods bend outwards to let past solid material which may accompany the sewage water.

An arrangement of this latter type cannot be used, however, in horizontal pipes or ducts.

Based on the above, there is therefore a need for an arrangement which prevents the advance of vermin in pipes and which overcomes the aforementioned obstacles.

SUMMARY OF THE INVENTION

The object of the present invention is therefore to provide an arrangement which can deter vermin from moving into a pipe system without killing the creatures, and a pipe section comprising the arrangement.

According to a first aspect of the invention, this and other objects are achieved with an arrangement for preventing vermin from advancing in a pipe, designed for fitting in a delimited part of the pipe and comprising a contact pole of electrically conductive material and an opposite pole.

The contact pole, which is partially movable in the longitudinal direction of the pipe, is arranged on the inner side of the pipe, and the opposite pole is arranged separate from said contact pole in order to earth the inner side of said pipe and is arranged in or on the inner side of said pipe, the arrangement, in an active state and when the contact pole is energized, which causes a difference in electrical potential between said opposite pole and said contact pole, administering an electric shock to a vermin which tries to pass the contact pole.

By using an electric shock to deter a vermin trying to make its way into a pipe system, a solution is provided which alleviates the drawbacks of the prior art.

By vermin is meant creatures such as rodents, for example rats.

It has previously been known that crawling marine animals can be kept away from certain areas of the sea bed by arranging electric barriers along the bottom. Such a solution is shown in U.S. Pat. No. 2,193,915, according to which document long conductors are provided for generating a surrounding electric field by which the animal is stopped in its tracks.

The same principle is used according to US-2007/0039233, which document describes how creatures can be deterred from climbing into an aeroplane parked on an airfield. The described arrangement comprises an openable frame, which is placed around an aeroplane wheel and which on its top side has two sets of closely placed pole plates with opposite polarity, so that a creature which makes contact with two adjacent pole plates is subjected to an electric shock and is thereby deterred from continuing in towards the aeroplane wheel.

However, these two electric-shock-based solutions are not intended for pipes, nor are they configured in a way which allows such use.

The arrangement according to the present invention is fitted in a pipe and acts as an "electrified fence" to prevent vermin from passing. The contact pole, which is preferably directed substantially at right angles to the longitudinal direction of the pipe, is designed to be swung away in the event of high liquid flows or upon the passage of solid or semi-solid bodies or faeces in the water flow.

The contact pole covers a sufficient length of passage of the pipe to prevent a vermin from passing through without touching both the contact pole and the inner side of the pipe which is earthed by the opposite pole. When the vermin therefore tries to pass, it makes contact with the contact pole at the same time as with the opposite pole, whereupon electricity is conducted through the vermin, which in all probability shrinks back and turns around.

The opposite pole can be formed by an opposite pole layer of electrically conductive material, which opposite pole layer is placed along at least a part of the periphery of the inner side of the pipe, substantially diagonally from where said contact pole is arranged against the inner side of the pipe, and the opposite pole layer being arranged such that the vermin, when passing the contact pole, simultaneously touches the opposite pole layer.

The provision of an opposite pole layer, preferably a plate, ensures that a material is available which it is possible to earth, the arrangement being able to be used in all types of pipes, including those which cannot in themselves constitute an opposite pole, i.e. earth.

A first conductor can be coupled to the contact pole, a second conductor coupled to the opposite pole, and the two conductors coupled, in turn, to a current source.

By coupling conductors to the contact pole and the opposite pole respectively and connecting these to a current source, the arrangement can be energized. Preferably, the arrangement is fed with high-voltage current from a unit which can deliver pulsating current with very high voltage and low current intensity so that the vermin will not be killed, but will instead be deterred from trying again.

The arrangement can be adapted for arrangement in a horizontally situated part of said pipe.

The placement of the arrangement in a horizontal pipe allows a simplified installation. This is especially true if the pipe is situated outside rather than inside a building, as is often the case for substantially horizontal pipes.

According to one embodiment, the pipe is a sewage pipe.

The problems with vermin are most prevalent for sewage pipes, but the invention can also be applied in other pipes, such as a ventilation pipe.

The pipe may also be a socket pipe or socket pipe section.

For example, the arrangement is placed in a service pipe, so that vermin on their way into a dwelling, for example, can be repelled already at an early stage in a pipe system before the pipe branches in the vertical direction.

Preferably, the electrically conductive material is metal.

Apart from metal, other conductive and semi-conducting materials can also, however, constitute the contact pole.

The contact pole can be designed such that, after having been swung away due to, for example, liquid flow through the pipe, it is automatically returned to a position essentially directed transversely to the pipe.

By making the contact pole, for example, be formed by flexible material with spring-back capability or be held up by an elastic material piece with spring-back capability, the arrangement ensures that the contact pole is returned to its normal position after having been dislodged by, for example, liquid flow in the pipe. Preferably, the elastic material piece is formed of a non-conductive material.

According to one embodiment, the opposite pole layer can extend along the whole of the periphery of the inner side of the pipe, thus forming an opposite pole ring.

It is thereby ensured that the creature comes into direct contact with the opposite pole.

The opposite pole ring can also constitute a holder for the contact pole.

Thus, by making the opposite pole layer run along the whole of the periphery of the inner side of the pipe and, in addition, making it constitute a holder for the contact pole, the arrangement is assembled in one piece.

The opposite pole ring can be formed by a resilient material which presses out against the inner side of the pipe and thus fixes the arrangement in place in the pipe.

By the opposite pole ring being formed of a resilient material which is clamped against the inner side of the pipe, the arrangement can consequently be retrofitted in existing pipe systems of varying thickness. The installation is preferably performed through service hatches, floor drains and the like.

According to a second aspect of the invention, a pipe section comprising the arrangement is provided.

By fitting the arrangement in a pipe section during the production of the latter, an obstacle to the advance of vermin in pipes according to the present invention can therefore already be put in place when the pipe system is laid.

BRIEF DESCRIPTION OF THE DRAWINGS

Especially preferred embodiments of the present invention will now be described in greater detail for illustrative purposes, with reference to the accompanying drawings.

FIG. 1 is a schematic end view of a first embodiment of the present invention, intended for fitting in a pipe.

FIG. 2 is a longitudinal section of the first embodiment shown in FIG. 1.

FIG. 3 is a perspective view of the first embodiment shown in FIGS. 1 and 2.

FIG. 4 is a perspective view of a pipe section according to one embodiment of the present invention, which pipe section is intended for insertion in a pipe system.

DETAILED DESCRIPTION OF PREFERRED EMBODIMENTS

The arrangement according to FIGS. 1 to 3 can be inserted in a part of a pipe (not shown), which, in the example, is formed by a substantially horizontal sewage pipe.

The arrangement comprises an opposite pole ring 11, here in the form of a metal arc, in which a flexurally resilient material piece 12, formed in the example by an insulated strip, is fixed.

At the opposite end of the insulated strip 12, a contact pole 13 is fastened. In the example, the contact pole 13 is formed by a metal disc, but the present invention is not, however, limited to this. The contact pole 13 constitutes a positive pole and is connected by an insulated conductor to the positive pole on a direct-current source (not shown).

The metal bow constitutes the opposite pole and is connected by means of an insulated conductor to the negative pole of the direct-current source. The two conductors are drawn through a hole in the wall of the sewage pipe, and sealing material around the hole helps to prevent liquid leakage.

The fact that the positive pole, i.e. the contact pole 13, has a flexible suspension mounting in the pipe means that the flow of the sewage water will not be impeded. The flexibility can derive from the fact that the metal disc is formed by an elastic material, which therefore makes the contact pole 13 resilient such that it can be swung away in the event of high liquid flows or upon the passage of solid or semi-solid bodies or faeces in the sewage water flow. In the example, however, the flexibility is provided by the metal disc being fixed to an elastic material piece 12 having a spring-back capability. In both cases, the spring-back capability results in the contact pole 13 being returned to its normal position once it is no longer actuated by the liquid flow.

The metal disc occupies the greater part of the pipe in cross section, with a view to ensuring that a vermin will be unable to pass the arrangement without touching the metal disc. The contact pole 13 hangs preferably about 2-5 cm above the lowest inner point of the pipe so that there will not be constant contact between the contact pole 13 and the opposite pole ring 11, but the invention is not limited thereto.

As can be seen from FIGS. 1 and 3, the metal bow in the example, where the ends meet, has at one end a portion 15 from which a tab 16 has been punched out and bent downwards and inwards. The other end of the metal bow is configured firstly with a hook 17 for hooking in the recess in the portion 15, and secondly with a downwardly and inwardly directed tab 18. The hook 17 and the recess portion 15 allow an opposite pole ring 11 to be formed.

Preferably, the distance between the edges of the metal bow and of the metal plate should nowhere be more than 2-3 cm apart, although the invention is not limited to this. In the example, in which the contact pole 13 is not entirely circular, the metal tabs 16 and 18 therefore serve to ensure that an appropriate distance between the positive pole and the negative pole is maintained in the region of the flexible insulating strip 12.

The embodiment according to FIG. 4 has been configured as a socket pipe section 20, but could also be formed as a straight socket pipe.

In this case, the opposite pole 21, i.e. earth, has been configured as a metal plate cast in the socket pipe 20.

The contact pole 22 is in this case configured as a circular disc, the edge of which preferably, but not necessarily, lies 2-3 cm from the inner side of the pipe.

In the example, the contact pole 22 is supported by a flexible strip 12, which is fastened in the pipe wall and which is made of a resilient material, so that the contact pole 22 in the normal position extends substantially perpendicularly through the pipe.

The opposite pole 21, serving as the negative or earth pole, extends in the example along half the diameter of the inner edge of the pipe section 20, i.e. up to about half the thickness of the pipe, so that direct electrical contact cannot occur even if the contact pole 22, i.e. the metal disc, is bent very strongly upwards in the event of high liquid flows through the sewage pipe.

The opposite pole 21 and the contact pole 22 are connected to electrical conductors for connection to a current source (not shown).

The fact that one electric pole is supported by a flexible resilient strip 12 means that the arrangement will not impede the flow of the sewage water, even if this were to contain solid or semi-solid faeces.

At the same time, a vermin, such as a rat or other rodent, will be deterred from continuing in through the sewage pipe and into the sewage network of the property, since it cannot avoid making contact with both the positive and the negative poles. When standing with its feet on the opposite pole 11, 21 at the same time as its nose touches the contact pole 13, 22, the creature is consequently subjected to an electric shock.

The current source used in the arrangement according to the invention is preferably formed by a unit which delivers pulsating current with very high voltage and low current intensity so that the rat or rodent will be deterred without being killed.

Cables to the current source are advantageously drawn up through a service hatch, floor drain or the like.

The invention claimed is:

1. An arrangement for preventing vermin from advancing in a pipe, designed for fitting in a delimited part of said pipe and comprising a contact pole of electrically conductive material and an opposite pole, wherein said contact pole, which is partially movable in the longitudinal direction of said pipe, is arranged on the inner side of said pipe, and said opposite pole is arranged separate from said contact pole in order to earth the inner side of said pipe and is arranged in or on the inner side of said pipe, the arrangement, in an active state and when said contact pole is energized, which causes a difference in electrical potential between said opposite pole and said contact pole, administering an electric shock to a vermin which tries to pass said contact pole.

2. The arrangement according to claim 1, wherein said opposite pole is formed by an opposite pole layer of electrically conductive material, which opposite pole layer is placed along at least a part of the periphery of the inner side of said pipe, substantially diagonally from where said contact pole is arranged against the inner side of said pipe, and wherein said opposite pole layer is arranged such that the vermin, when passing said contact pole, simultaneously touches said opposite pole layer.

3. The arrangement according to claim 1, wherein a first conductor is coupled to said contact pole, a second conductor is coupled to said opposite pole, and said conductors are coupled to a current source.

4. The arrangement according to claim 1, wherein said arrangement is adapted for arrangement in a horizontally situated part of said pipe.

5. The arrangement according to claim 1, wherein said pipe is a sewage pipe.

6. The arrangement according to claim 1, wherein said pipe is one of a socket pipe or a socket pipe section.

7. The arrangement according to claim 1, wherein said electrically conductive material is metal.

8. The arrangement according to claim 1, wherein said contact pole is designed such that, after having been swung away due to, for example, liquid flow through the pipe, it is automatically returned, by spring-back, to a position essentially directed transversely to the pipe.

9. The arrangement according to claim 2, wherein said opposite pole layer extends along the whole of the periphery of the inner side of said pipe, thus forming an opposite pole ring.

10. The arrangement according to claim 9, wherein said opposite pole ring constitutes a holder for said contact pole.

11. The arrangement according to claim 10, wherein said opposite pole ring is formed by a resilient material which presses out against the inner side of the pipe and thus fixes said arrangement in place in said pipe.

12. A pipe section comprising an arrangement according to claim 1.

* * * * *